US012621077B2

(12) United States Patent
Wang et al.

(10) Patent No.: US 12,621,077 B2
(45) Date of Patent: May 5, 2026

(54) ELECTROMAGNETIC PULSE GENERATOR SYSTEM

(71) Applicant: BAE SYSTEMS Information and Electronic Systems Integration Inc., Nashua, NH (US)

(72) Inventors: Renyuan Wang, Windham, NH (US); John E. McGeehan, Manchester, NH (US); Sean Sengele, Groton, MA (US); Amrita V. Masurkar, Burlington, MA (US); Timothy M. Dresser, Wilton, NH (US); Caprice Gray Haley, Somerville, MA (US); Alexander D. Johnson, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 227 days.

(21) Appl. No.: 18/741,099

(22) Filed: Jun. 12, 2024

(65) Prior Publication Data

US 2025/0385746 A1 Dec. 18, 2025

(51) Int. Cl.
*H04K 3/00* (2006.01)

(52) U.S. Cl.
CPC .................................... *H04K 3/62* (2013.01)

(58) Field of Classification Search
CPC ........................................................ H04K 3/62
See application file for complete search history.

(56) References Cited

U.S. PATENT DOCUMENTS

| | | | | |
|---|---|---|---|---|
| 7,034,411 | B2 | 4/2006 | Chen | |
| 7,690,288 | B2 | 4/2010 | Calico | |
| 7,741,615 | B2 * | 6/2010 | Putterman ................ | H01J 1/30 313/15 |
| 7,830,040 | B2 | 11/2010 | Mcdonald | |
| 8,536,528 | B2 | 9/2013 | Difoggio | |

(Continued)

FOREIGN PATENT DOCUMENTS

| | | | |
|---|---|---|---|
| DE | 202013005768 | U1 | 7/2013 |
| WO | 2013036814 | A2 | 3/2013 |
| WO | 2015116343 | A1 | 8/2015 |

OTHER PUBLICATIONS

J. A. Geuther and Y. Danon, "high-energy x-ray production with pyroelectric crystals", J. of App. Phys., 97, 104916, (2005).

*Primary Examiner* — Timothy A Brainard
(74) *Attorney, Agent, or Firm* — Maine Cernota & Curran

(57) ABSTRACT

A reusable battery-operated electromagnetic pulse (EMP) generator system comprising a pyroelectric element that accumulates high-voltage charge, immersed in a dielectric bath. A heating element heats the dielectric bath and the pyroelectric element, while a temperature sensor monitors their temperatures. The components are housed within a thermal chamber that provides insulation. A switched pulse actuator controls the rapid discharge of the accumulated charge from the pyroelectric element. The system includes a pulse shaping subsystem, a power supply unit, and a broadband radiating element such as an ultrawideband antenna for emitting the EMP. The pyroelectric element is heated and cooled to control accumulation of high voltage charge, which is discharged as an electrical pulse that is shaped and radiated as EMP.

20 Claims, 9 Drawing Sheets

(56) References Cited

U.S. PATENT DOCUMENTS

| | | | | |
|---|---|---|---|---|
| 8,723,390 | B2 | 5/2014 | Corbett | |
| 9,626,516 | B1 | 4/2017 | Gardner | |
| 10,147,863 | B2 | 12/2018 | Xu | |
| 10,247,525 | B2 | 4/2019 | Bitar | |
| 10,443,139 | B2 | 10/2019 | Mills | |
| 10,742,025 | B2 | 8/2020 | Carty | |
| 10,938,204 | B1 | 3/2021 | Carty | |
| 10,969,207 | B1 | 4/2021 | Tanielian | |
| 11,115,010 | B1 | 9/2021 | Koeth | |
| 11,248,893 | B2 | 2/2022 | Rastegar | |
| 11,460,260 | B2 | 10/2022 | Howard | |
| 11,674,769 | B2 | 6/2023 | Howard | |
| 11,965,717 | B2 | 4/2024 | Murray | |
| 2010/0011768 | A1 | 1/2010 | Hacsi | |
| 2011/0260075 | A1 * | 10/2011 | Bromberg | H01J 49/147 250/427 |
| 2012/0326527 | A1 | 12/2012 | Tuva | |
| 2014/0245916 | A1 | 9/2014 | Adler | |
| 2015/0108851 | A1 * | 4/2015 | Kumar | H02J 3/381 307/106 |
| 2018/0159459 | A1 | 6/2018 | Mills | |
| 2024/0079868 | A1 | 3/2024 | Doynov | |

* cited by examiner

ELECTROMAGNETIC PULSE GENERATOR SYSTEM

FIELD OF THE DISCLOSURE

The present disclosure relates to electromagnetic pulse (EMP) generation technology, and specifically to EMP generators that utilize the pyroelectric effect in pyroelectric materials.

BACKGROUND

Devices designed to emit bursts of electromagnetic energy have applications across various fields, including but not limited to, electronic warfare and asset protection, data security, and electronic equipment testing. Traditional methods for generating these bursts involve complex mechanisms that can be cumbersome and pose safety risks. These methods often involve the use of explosives or processes that can lead to the devices being single-use, raising concerns about sustainability and cost-effectiveness There are also electronic based solutions, but these are typically bulky and power-hungry.

There is a recognized call for a more practical approach to creating EMP energy bursts, with more compact equipment that does not require an external power source. A system that does not rely on destructive materials or methods and can operate multiple times without the need for extensive reconfiguration would be a significant advancement. Such a system would address concerns related to safety, operational efficiency, and the environmental impact of the current technologies, fulfilling a gap in the market for safer and more reliable energy burst generation.

SUMMARY

One embodiment is an electromagnetic pulse (EMP) generator system comprising a dielectric bath; a pyroelectric element immersed in the dielectric bath and configured to accumulate high-voltage charge across polar faces thereof; a heating element configured to heat the dielectric bath and the pyroelectric element; a temperature sensor configured to sense the temperature of the dielectric bath and/or the pyroelectric element; a thermal chamber for enclosing the pyroelectric element, the dielectric bath, the heating element, and the temperature sensor, and for providing thermal insulation from external environments; and a switched pulse actuator configured to control and actuate a rapid electrical discharge of the accumulated charge from the pyroelectric element.

In another embodiment, the EMP generator system further comprises a battery pack for powering at least the heating element to heat the dielectric bath and the pyroelectric element.

In a further embodiment, the EMP generator system further comprises a pulse shaping subsystem configured to shape the electrical discharge in the time domain.

In still another embodiment, the dielectric bath comprises a solid dielectric, a liquid dielectric, and/or a gel dielectric.

In an even further embodiment, the EMP generator system further comprises a broadband radiating element for radiating, as electromagnetic pulse radiation, energy from an electrical discharge.

In yet another embodiment, the broadband radiating element is a ultrawideband antenna configured so as to radiate substantially isotropically.

In yet a further embodiment, the broadband radiating element is a ultrawideband tapered slot antenna.

In yet a still further embodiment, the EMP generator system further comprises integrated control electronics to control and coordinate all parts of the EMP generator system.

In yet even another embodiment, the EMP generator system further comprises a remote control configured to communicate with the integrated control electronics.

In yet an even further embodiment, the EMP generator system further comprises an isolator configured to provide isolation between the remote control and the integrated control electronics while facilitating data communication between the remote control and the integrated control electronics.

In still even another embodiment, the isolator comprises an optical link.

In still an even further embodiment, the isolator comprises a radio link.

In still yet another embodiment, the battery pack is rechargeable.

In still yet a further embodiment, the pyroelectric element comprises an $LiTaO_3$ crystal.

In still yet a further embodiment yet, the pyroelectric element comprises a plurality of pyroelectric sub-elements that are connected in series and/or connected in parallel.

In yet a still further embodiment, each of opposing polar faces of the pyroelectric element or of a pyroelectric sub-element is in intimate electrical contact with an electrical conductor over less than the entirety of the polar face.

A different embodiment is a method for generating an electromagnetic pulse (EMP) including: electrically shorting between two polar faces of a pyroelectric element; electrically isolating between the polar faces of the pyroelectric element at a temperature $T_1$; heating the pyroelectric element to a temperature $T_2$ ($T_2>T_1$) while maintaining the electrical isolation; discharging charge that has accumulated on the polar faces of the pyroelectric element to thereby produce an electrical pulse; radiating the electrical power of the electrical pulse from an antenna as an EMP; and cooling the pyroelectric element to a temperature $T_3$ ($T_3<T_2$).

In another different embodiment, the method for generating an EMP further includes further heating the pyroelectric element to a temperature $T_4$ ($T_4>T_2$) while maintaining electrical isolation.

In a further different embodiment, while maintaining a state of electrical isolation between the polar faces of the pyroelectric element, heating of the pyroelectric element is carried out with adequate rapidity such that the heating is achieved over a time interval that is shorter than the RC time constant of an equivalent resistance-capacitance circuit that characterizes the discharge of the charge on the pyroelectric element through natural auto-discharging through the pyroelectric element and/or through natural conduction through the environment surrounding the pyroelectric element when the pyrolytic element is in the electrically isolated state.

In still another different embodiment, while maintaining a state of electrical isolation between the polar faces of the pyroelectric element, cooling of the pyroelectric element is carried out with adequate rapidity such that the cooling is achieved over a time interval that is shorter than the RC time constant of an equivalent resistance-capacitance circuit that characterizes the discharge of the charge on the pyroelectric element through natural auto-discharging through the pyroelectric element and/or through natural conduction through the environment surrounding the pyroelectric element when the pyrolytic element is in the electrically isolated state.

In a still further different embodiment, cooling of the pyroelectric element is carried out through natural cooling.

In even another different embodiment, the method for generating an EMP further includes shaping the electrical pulse.

Implementations of the techniques discussed above may include a method or process, a system or apparatus, a kit, or a computer software stored on a computer-accessible medium. The details of one or more implementations are set forth in the accompanying drawings and the description below. Other features will be apparent from the description and drawings, and from the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
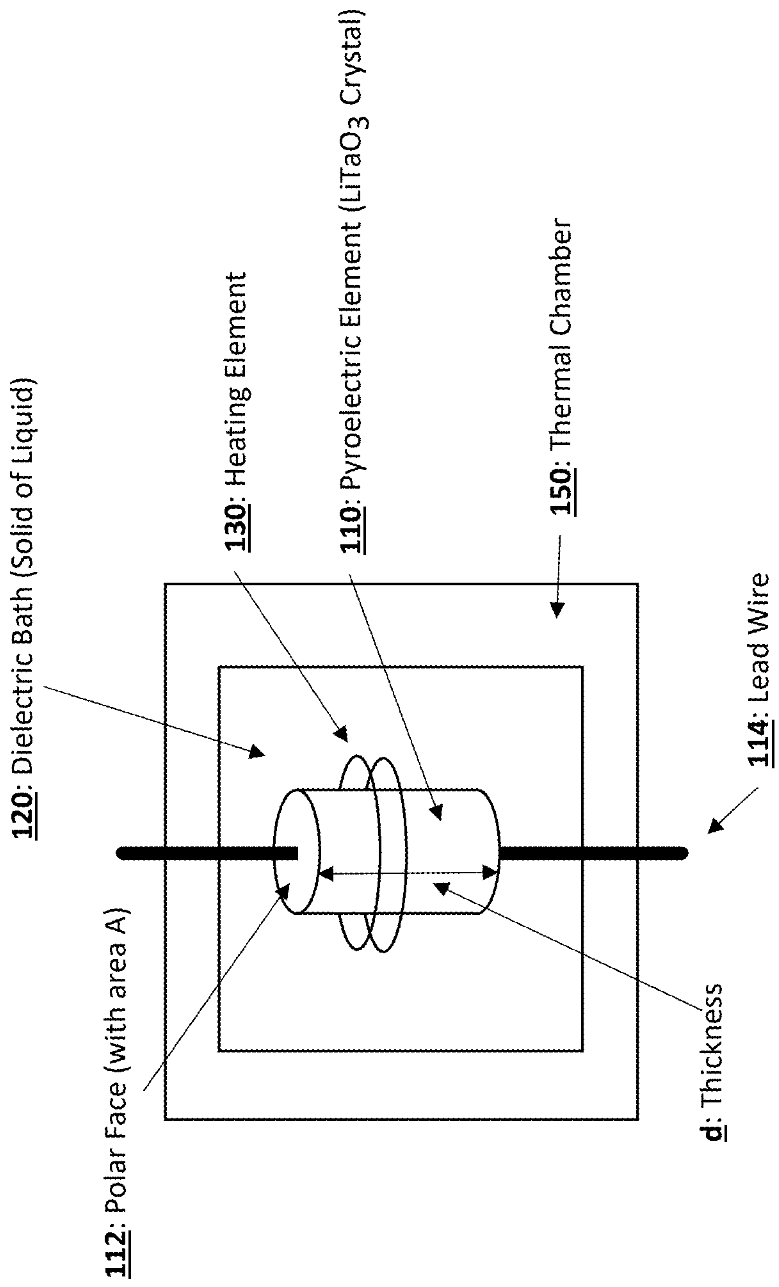
FIG. 1 is an illustration showing components of a pyroelectric EMP generator disposed within a thermal chamber, in accordance with embodiments of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Electromagnetic pulse (EMP) generation is a field of technology with significant applications in both military and civilian sectors. EMPs can disrupt electronic systems, making them a tool for electronic warfare and asset protection. In civilian sectors, EMPs can also be used in data security, testing robustness of electrical systems, and in research and development. Conventional methods of generating EMPs often rely on the use of explosives or complex, bulky equipment. These methods pose logistical challenges and safety risks, and typically result in devices that are not reusable. The destructive nature of explosive-driven EMP generators, in particular, limits their application and increases the cost and complexity of operations that involve multiple uses.

Existing portable EMP devices, while effective in their function, suffer from several drawbacks. The reliance on explosives for power renders the devices single-use and also introduces handling and transportation difficulties due to the dangers of explosives. Furthermore, the explosive-driven mechanisms lead to the destruction of the devices themselves, requiring the equipment to be replaced with each use. This results in significantly increased operational costs and logistical burdens. Additionally, the rapid mechanical shocks used in some pyroelectric material-based EMP generators can be difficult to control with precision, potentially leading to inconsistent EMP characteristics.

The system disclosed herein addresses the challenges associated with previous EMP generators by introducing a reusable, battery-powered portable EMP generator that exploits the pyroelectric effect in pyroelectric crystals or other pyroelectric materials. This system eliminates the need to use explosives, thereby reducing the risks and logistical issues associated with their transport and handling, and eliminates the need to replace the equipment with each use. The compact battery-operated EMP generator of embodiments enables greater ease-of-use than has been available in the past.

The EMP generator of embodiments of the present disclosure is designed to be compact, with dimensions smaller than a football, and includes a battery pack that powers the system. A core component of the system in embodiments is a pyroelectric EMP source that generates high-voltage charge accumulation through controlled heating of a pyroelectric element that is immersed in a dielectric bath. In embodiments, the system further comprises a switched pulse actuator for rapid discharge of the accumulated charge to produce a pulse, a pulse shaping subsystem, and a broadband radiating element for the emission of the EMP. In embodiments, integrated control electronics ensure coordination and control of system components, including heating and charging, discharging, and power regulation. The portability and reusability of the system make this solution a versatile option for generating EMPs that overcomes the drawbacks of previous methods.

FIG. 1 shows an electromagnetic pulse (EMP) generator system 100. This system includes a pyroelectric element 110 having a body that has opposing polar faces 112, a dielectric bath 120 (which, in embodiments, may be solid, liquid, a gel, or a combination thereof), a heating element 130, lead wire(s) 114, and a thermal chamber 150. The pyroelectric element 110 is positioned within the dielectric bath 120. The polar faces 112 of the pyroelectric element 110 oppose each other in the direction in which the pyroelectric element 110 inherently develops charge separation, and are configured to accumulate high-voltage charge. The heating element 130 is responsible for heating the dielectric bath 120 and the pyroelectric element 110. Lead wires 114 provide electrical connectivity, and the thermal chamber 150 encloses the components, providing thermal insulation from external environments.

The pyroelectric element 110 serves as a central component of the EMP generator system 100, designed to accumulate high-voltage charge across the polar faces 112. The pyroelectric element 110 may be made from any of a variety of materials, either crystalline or non-crystalline, that exhibit pyroelectric properties, depending on the specific use application. In an exemplary embodiment, $LiTaO_3$ is selected for the pyroelectric element 110 due to its favorable pyroelectric properties, relatively low dielectric constant, high Currie temperature, excellent thermal durability, and high resistivity; however, there is no limitation thereto, and other pyroelectric materials may be selected instead depending on the use application, and more specifically depending on the voltage, charge, total developed energy, charging time, charged-state holding time, discharge time, power, allowed time between pulses, and the like required by the use application. Note that the pyroelectric element 110 need not be a single crystal or element, but rather may comprise a plurality of pyroelectric crystals or pyroelectric sub-elements connected in parallel and/or series, depending on the use requirements for voltage and charge. The thickness d of the pyroelectric element 110 (the distance between the polar faces 112 thereof) may be selected depending on the requirements of the use application and the material properties of the pyroelectric material used, noting that, as will be explained below, the voltage developed across the polar faces 112 will scale linearly with this thickness d. Similarly, the area A of the polar faces 112 of the pyroelectric element 110 may be selected depending on the power requirements of the use application, noting that the total charge accumulation (total energy accumulation) will scale linearly with this area A. Although the physical shape of the pyroelectric element 110 in embodiments may be a rod, a cylinder, a disk, a rectangular solid, or any other shape for the body that supports the presence of the opposing polar faces 112, a disk is used in an exemplary embodiment that was constructed for testing purposes. As will be described below, electrical charge develops on the polar faces 112 thereof.

Electrodes 250 may be formed from electrical conductors on the polar faces 112, in intimate electrical contact therewith to facilitate transfer of charges, as will be described below. The electrodes may be formed through, for example, sputtering or known metal deposition technologies, and may be shaped through photolithography or other methods. In embodiments the electrodes formed on the polar faces do not cover the entirety of the polar faces, but rather are configured to exclude coverage of the edge portions of the polar faces 112, so as to minimize parasitic electrical current from the edges of the polar faces 112 when a strong electric field is developed across the pyroelectric element 110, and also to prevent shorting that may be cause by variability in the manufacturing process. The edge portion of the electrode 250 on a polar face 112 may be close to the edge of the polar face 112, or may also be recessed slightly from the edge of the polar face 112 to provide a margin between the edge of the electrode 250 and the edge of the polar face 112. Lead wires 114 lead out from the electrodes 250 to outside of the thermal chamber 150, connecting to a switched pulse actuator 160, described below.

The dielectric bath 120, which may be solid, liquid, or gel, serves multiple functions. The dielectric bath 120 acts as an insulator to prevent premature discharge of the accumulated charge on the pyroelectric element 110, and also as a medium for uniform and efficient heat distribution when heated by the heating element 130. The choice between a solid or liquid dielectric bath 120 depends on the desired thermal and electrical properties for the use application of the EMP generator system 100.

In applications, the heating element 130 is configured to heat the dielectric bath 120 and the pyroelectric element 110. As will be described in more detail below, the heating element 130 causes a high voltage to develop across the polar faces 112 of the pyroelectric element 110 through the pyroelectric effect by rapidly increasing the temperature of the pyroelectric element 110. The heating element 130 can be implemented using various technologies capable of delivering the thermal energy, such as resistive heating coils or inductive heating mechanisms.

Lead wires 114 can be used to provide electrical connections within the EMP generator system 100. These wires connect the pyroelectric element 110 to other components, such as the switched pulse actuator (160 in FIG. 2), which controls and actuates the rapid electrical discharge of the accumulated charge from the pyroelectric element 110.

The thermal chamber 150 encloses the pyroelectric element 110, the dielectric bath 120, the heating element 130, and portions of the lead wires 114. The thermal chamber 150 provides thermal insulation, enabling rapid heating of the pyroelectric element 110 and the dielectric bath 120. In embodiments, the degree of the thermal insulation provided by the thermal chamber 150 may be adjustable through, for example, openable thermal vents (not shown), detachable thermal conductors (not shown) that pass through the thermal chamber 150, or the like, enabling heat to escape more readily, depending on the use application.

Figure 2:
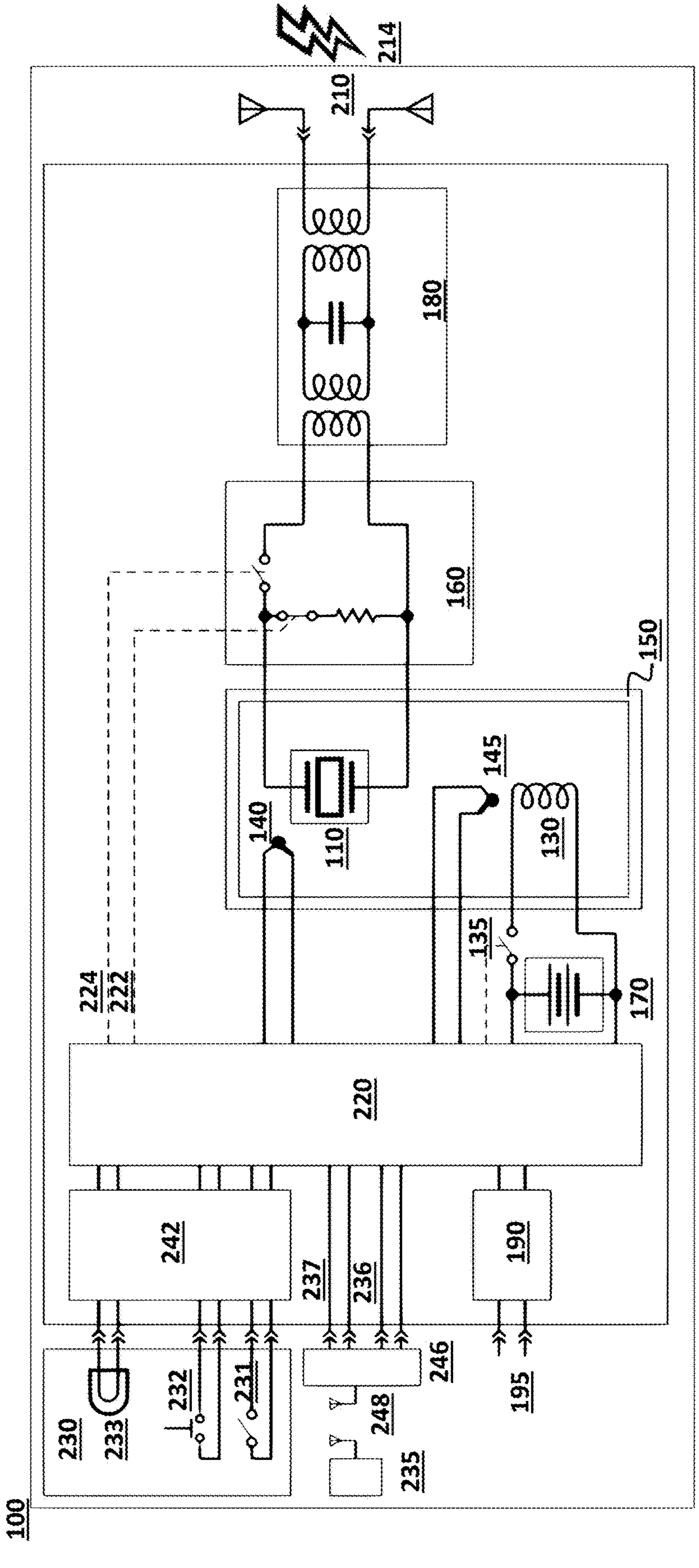
FIG. 2 is a schematic describing an EMP generator system, in accordance with embodiments of the present disclosure.

FIG. 2 describes various components of the EMP generator system 100 and their interconnections. The system includes the pyroelectric element 110, the dielectric bath 120, the heating element 130, a heating switch 135, a dielectric temperature sensor 140, a heater coil temperature sensor 145, the thermal chamber 150, the switched pulse actuator 160, a battery pack 170, a pulse shaping subsystem 180, a power supply unit 190, an external power input 195, a broadband radiating element 210, integrated control electronics 220, a wired remote control 230, and an isolator 240.

The switched pulse actuator 160 controls the rapid discharge from the pyroelectric element 110 that produces an electrical discharge 212 that is to be emitted as an EMP 214, and, in some embodiments, also functions to short the polar faces 112 of the pyroelectric element 110 to reset the pyroelectric element 110 to a fully discharged state in preparation for use, as will be described below. The battery pack 170, in some embodiments, provides power to the heating element 130, to allow rapid heating of the heating element 130. The pulse shaping subsystem 180 shapes the electrical discharge. The power supply unit 190, which, in embodiments, may comprise an AC/DC converter that converts power inputted from an external power input 195, which, in some embodiments, may be AC power, to provide electrical power to the system. The integrated control electronics 220 coordinate the operation of the EMP generator system 100, and the remote control 230 communicates with the integrated control electronics 220. The isolator 240 provides electrical isolation between the remote control 230 and the integrated control electronics 220.

The dielectric bath 120 insulates the pyroelectric element 110, and the heating element 130 is controlled by the integrated control electronics 220 which, based on the temperatures sensed by a dielectric temperature sensor 140 and a heater coil temperature sensor 145, controls a heating switch 135 to heat the dielectric bath 120 and the pyroelectric element 110. Note that although the heating element 130 is depicted in FIG. 2 as away from the pyroelectric element 110, it may instead be configured coiled around the pyroelectric element 110, as indicated in FIG. 1. The heating element 130 may use known resistive or inductive heating elements without particular limitation, but in some embodiments is capable of generating no less than about 300 watts of heat to ensure rapid heating of the pyroelectric element 110. Note that, in other embodiments, heating of the dielectric bath 120 and the pyroelectric element 110 need not necessarily be through a resistive or inductive heating element, but may be achieved through radiant heating, microwave heating, plasma heating, ultrasonic heating, or any other heating scheme that is otherwise compatible with the EMP generator system 100, where the term "heating element 130" is intended to cover all of these types of heating systems. In some embodiments, the thermal chamber 150 encloses these components, providing thermal insulation.

The switched pulse actuator 160 functions to actuate the rapid electrical discharge of the accumulated charge from the pyroelectric element 110, converting the electrical energy of the accumulated charge into a usable EMP 214. The switched pulse actuator 160 is configured to enable rapid switching of high power levels with high voltages at high currents, as will be described below. Although not limited thereto, in embodiments, the switched pulse actuator 160 may be utilize, for example, a known spark gap switch, or an array of microelectromechanical switches (MEMS) that are connected serially and in parallel to support the applicable voltage and current requirements. The battery pack 170, which, in some embodiments, provides power to the heating element 130, may comprise rechargeable batteries, recharged with power supplied by the power supply unit 190. In some embodiments the battery pack 170 may comprise, for example, three Tesla 4680 batteries, although there is no limitation thereto. The pulse shaping subsystem 180, which includes a network of resonating circuits and delay elements, shapes the electrical discharge 212 in the time domain to achieve the desired characteristics for the EMP 214.

The broadband radiating element 210 of the EMP generator system 100 is used to emit the shaped electrical discharge 212 as an EMP 214. Depending on the use application, in embodiments this broadband radiating element 210 may be an ultrawideband antenna capable of isotropic EMP emission over an ultrawide spectrum or an ultrawideband antenna configured to emit the EMP 214 over an ultrawide spectrum with prescribed directionality, such as an ultrawideband tapered slot antenna. The frequency response, input impedance, directionality, and other aspects of the broadband radiating element 210 may be designed as appropriate for the use application by those skilled in the art using known analytical and design techniques.

In an embodiment as illustrated in FIG. 2, a power supply unit 190 receives electrical power from an external power input 195 and supplies this power to the system, providing power to the heating element 130 and other components of the EMP generator system 100. The integrated control electronics 220, which control a discharge disable (shorting) control line 222 and trigger control line 224, control and coordinate the parts of the system, ensuring synchronized operation and effective EMP generation.

The remote control, which can be a wired remote control 230 and/or a wireless remote control 235, allows for remote operation of the EMP generator system 100. In embodiments the remote control 230 includes an arming switch 231, a trigger switch 232, and a ready indicator 233. In embodiments the arming switch may be used to cause the integrated electronics 220 to apply power to the heating element 130 to heat the pyroelectric element 110. When, in some embodiments, the dielectric temperature sensor 140 indicates that a prescribed temperature has been reached, the integrated electronics 220 cause illumination of the ready indicator 233, alerting an operator that the EMP generator system 100 is armed and ready for use, at which time the operator may use the trigger switch 232 to cause the integrated electronics 220 to apply a signal to the trigger control line 224 to trigger the switched pulse actuator 160 to create a pulse through discharging the pyroelectric element 110. In other embodiments, the integrated electronics 220 apply this signal automatically based on the input from the dielectric temperature sensor 140, without awaiting an action by the operator.

The isolator 240 provides electrical isolation between the remote control 230 or 235 and the integrated control electronics 220 while facilitating signal communication therebetween. In some embodiments, such as with a wired remote control 230, the isolator 240 may comprise an optical isolator 242 with an optical link 244. In some embodiments, such as with a wireless remote control 235, the isolator 240 may comprise a radio transceiver 246 with a radio link 248. This isolation serves to prevent unintended electrical interference that could affect the operation of the EMP generator system 100, as well as to protect the operator from the high voltages that are developed by the pyroelectric element 110.

Figure 3:
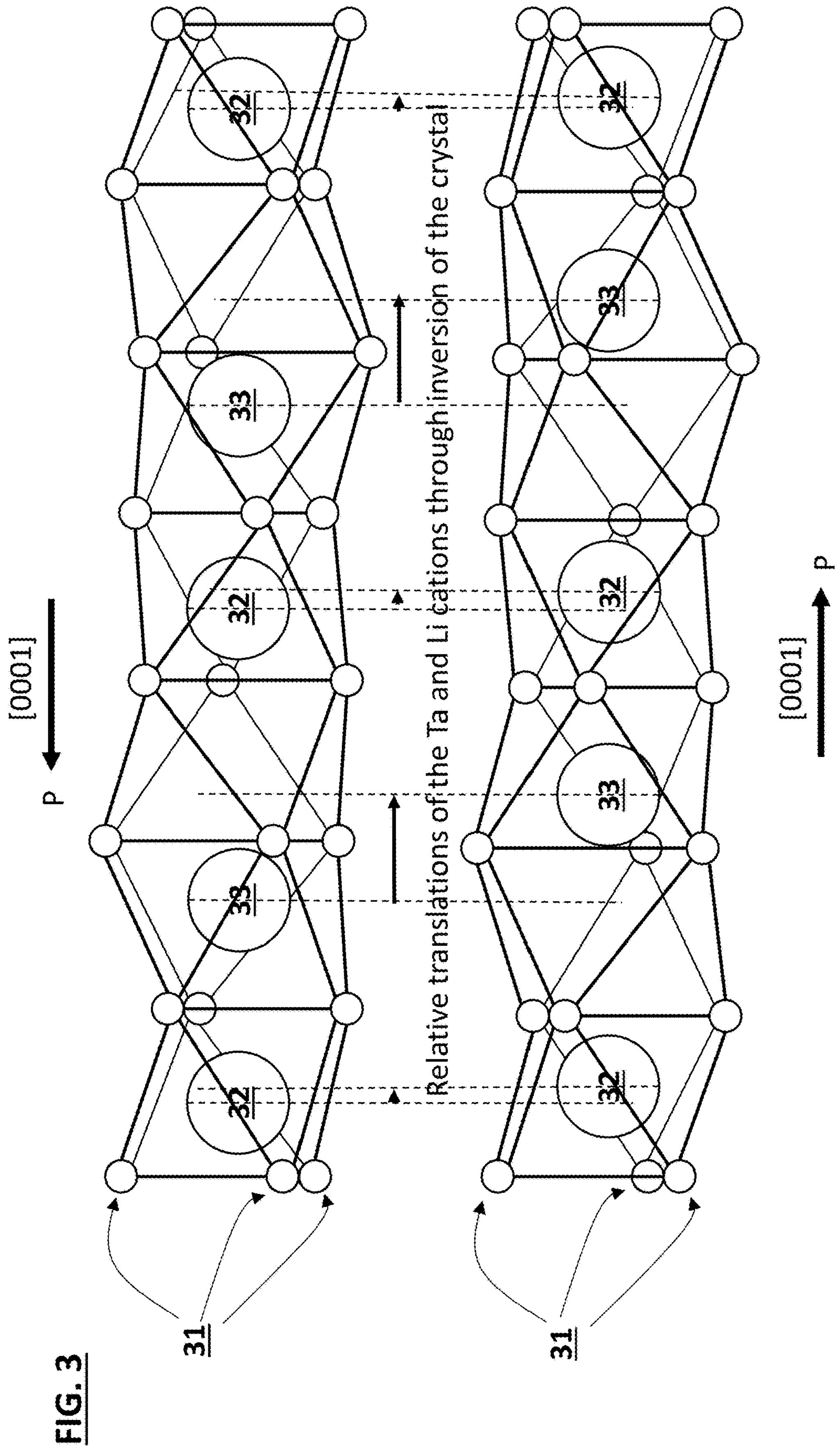
FIG. 3 is an illustration describing the lattice structure of a $LiTaO_3$ single crystal, highlighting the lack of inversion symmetry.

FIG. 3 will be used to explain the pyroelectric effect that is used to develop the high voltage charge that is used to generate the electromagnetic pulse. FIG. 3 illustrates the lattice structure of a $LiTaO_3$ single crystal, an example of a pyroelectric material used in the pyroelectric element 110 of the EMP generator system 100 in some embodiments. FIG. 3 highlights the arrangement of tantalum, lithium, and oxygen atoms within the crystal lattice. The illustration shows the orientation of the crystal along the axis, with the polarization direction P indicated.

The lattice structure is composed of alternating layers of Ta octahedron and Li octahedron, with vacant octahedron spaces therebetween. Oxygen atoms are located at the vertices of both the Ta and Li octahedrons, completing the octahedral coordination, with tantalum atoms occupying the Ta octahedrons and lithium atoms occupying the Li octahedrons. This arrangement results in a non-centrosymmetric structure, which lacks inversion symmetry along the axis. Indeed, as can be appreciated from FIG. 3, while the locations of the oxygen anions remain stationary when the crystal is inverted along its polar axis, the locations of the Ta and Li cations are shifted substantially. This asymmetry allows for the existence of spontaneous electropolarization within the crystal.

Figure 4:
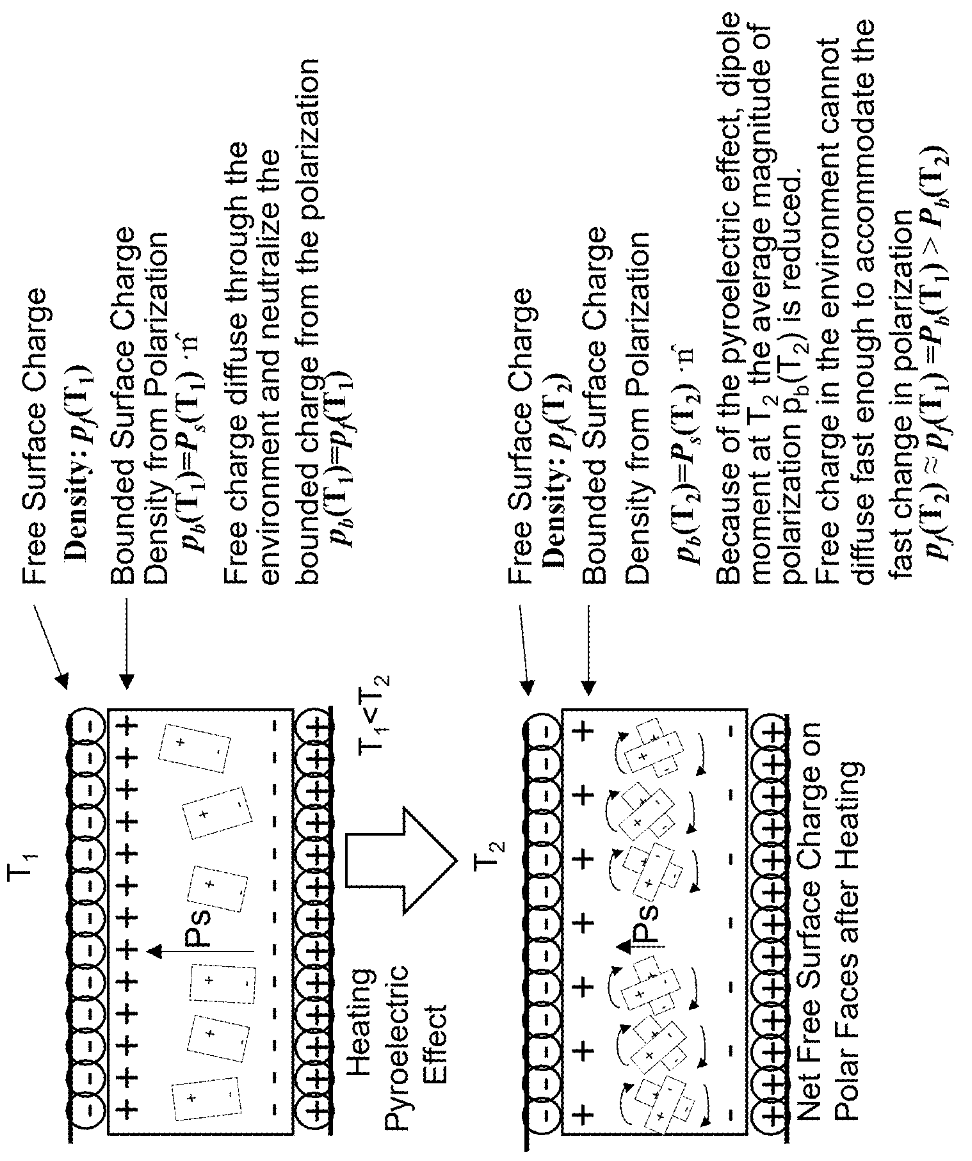
FIG. 4 is a schematic describing the principle of pyroelectric effect leading to charge accumulation on polar faces of a crystal due to heating, in accordance with embodiments of the present disclosure.

The spontaneous polarization is a result of the displacement of the positively charged centers (tantalum and lithium) relative to the negatively charged centers (oxygen) within the unit cell, creating a dipole moment within the unit cell, which manifests as spontaneous polarization on the opposing faces of the crystal. As can be seen in FIG. 4, the spontaneous polarization is unterminated at the polar faces of the crystal, leading to the development of a fixed surface charge density.

The distance d between the opposing polar faces 112 of the pyroelectric element 110 influences the electrical potential difference across the pyroelectric element 110. The greater the distance d, the greater the potential difference that can be achieved due to the linear scaling of the electrical potential with the separation of the polar faces 112. This characteristic can be exploited to generate high voltages across the pyroelectric element 110 within the EMP generator system 100.

FIG. 4 depicts the process of charge accumulation and the pyroelectric effect in a pyroelectric material, which is central to the operation of the EMP generator system 100. FIG. 4 shows the change in free surface charge density and bounded surface charge density from polarization as the material undergoes heating from an initial temperature $T_1$ to a higher temperature $T_2$.

At the initial temperature $T_1$, the pyroelectric element exhibits spontaneous polarization $\rho_f$ ($T_1$), resulting in a bounded surface charge density $\rho_b(T_1)$ on the polar faces. Free charges from the environment diffuse through the material and neutralize the bounded charge, leading to a net free surface charge density $Ps(T_1)$ that is effectively zero. In some embodiments, this is facilitated by shorting between the polar faces 112 (FIG. 1) through the switched pulse actuator 160 (FIG. 2). This state represents the equilibrium condition before the pyroelectric effect is induced.

Upon heating the material to a higher temperature $T_2$, the spontaneous polarization changes to $\rho_f$ ($T_2$) due to the pyroelectric effect. Intuitively this can be understood to be because the stronger thermal vibration of dipole moments at the elevated temperature reduces the average magnitude of polarization, resulting in a change in the bounded surface charge density to $\rho_b(T_2)$. Note however that this intuitive explanation is not strictly correct, as thermal vibration is just one mechanism that contributes to the pyroelectric effect, and other mechanisms, such as lattice expansion, also contribute to the pyroelectric effect. Regardless of the actual mechanism, however, since the free charge in the environment cannot diffuse fast enough to accommodate the rapid change in polarization, a net free surface charge density $\rho_s$ ($T_2$) develops on the polar faces 112. In the example illustrated in FIG. 4, this net free surface charge density on the polar faces 112 after heating is greater than the initial charge density, $\rho_s(T_2)>\rho_s(T_1)$, indicating accumulation of charge due to the pyroelectric effect. This accumulated charge can then be discharged rapidly to produce an electrical discharge 212 pulse, which is subsequently radiated as an EMP 214. Note that with other pyroelectric materials the pyroelectric effect may work in the opposite direction, where heating causes $\rho_s(T_2)<\rho_s(T_1)$; nevertheless, because it is the magnitude, as opposed to the direction, of the change in free surface charge density that causes a large voltage to develop across the pyroelectric element, such pyroelectric materials may also be used.

Figure 5:
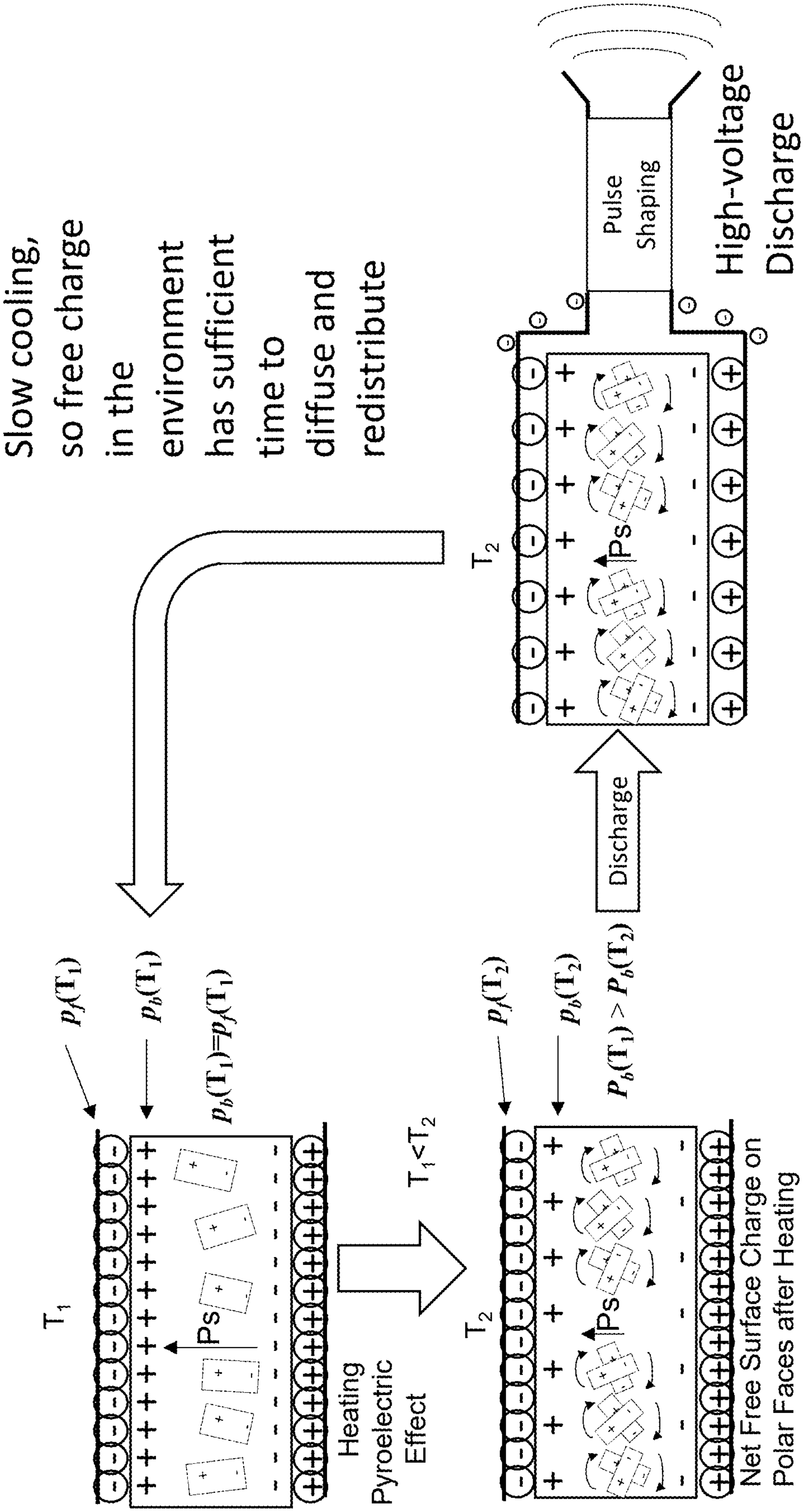
FIG. 5 is a schematic describing the operational phases of a pyroelectric EMP generator including heating, charge accumulation, and discharge, in accordance with embodiments of the present disclosure.

FIG. 5 illustrates schematically a sequence of events in a pyroelectric charge generation and discharge process that is utilized in an EMP generator system 100 of an embodiment. FIG. 5 shows the pyroelectric element at an initial temperature $T_1$, the increase in temperature to $T_2$ due to heating, and the subsequent discharge of accumulated charge.

Initially, at temperature $T_1$, the pyroelectric element has a spontaneous polarization $\rho_f(T_1)$, which leads to a bounded surface charge density $\rho_b(T_1)$. The free surface charge density $Ps(T_1)$ is neutral due to the environmental charges neutralizing the bounded charge. Upon heating the pyroelectric element to a higher temperature $T_2$, the spontaneous polarization changes, resulting in a new bounded surface charge density $\rho_b(T_2)$ and a net free surface charge after heating of $Ps(T_2)$ on the polar faces 112 due to the pyroelectric effect.

After the heating phase, the material has a net free surface charge on the polar faces that is greater than the initial charge density, $Ps(T_2)>Ps(T_1)$. This accumulated charge is then ready for discharge. The discharge process involves the switched pulse actuator (160 in FIG. 2) releasing the accumulated charge, resulting in a high voltage electrical discharge 212 that can be shaped into an electrical pulse through the pulse shaping mechanism (180 in FIG. 2). This electrical pulse is the precursor to the EMP 214 that the system is designed to generate.

As can be seen in FIG. 5, if, in embodiments, the pyroelectric element 110 is allowed to cool slowly, the free surface charge has time to diffuse and redistribute, effectively resetting the system. This slow cooling phase allows the pyroelectric element 110 to be reused for multiple EMP generation cycles. In embodiments, the polar faces 112 of the pyroelectric element 110 may be shorted by the switched pulse actuator 160 after cooling, ensuring that the system is reset. The ability to control the cooling of the pyroelectric element and subsequent charge redistribution is an aspect of the design of the EMP generator system 100 that enables repeated use of the pyroelectric element 110 while maintaining the pyroelectric properties.

Figure 6:
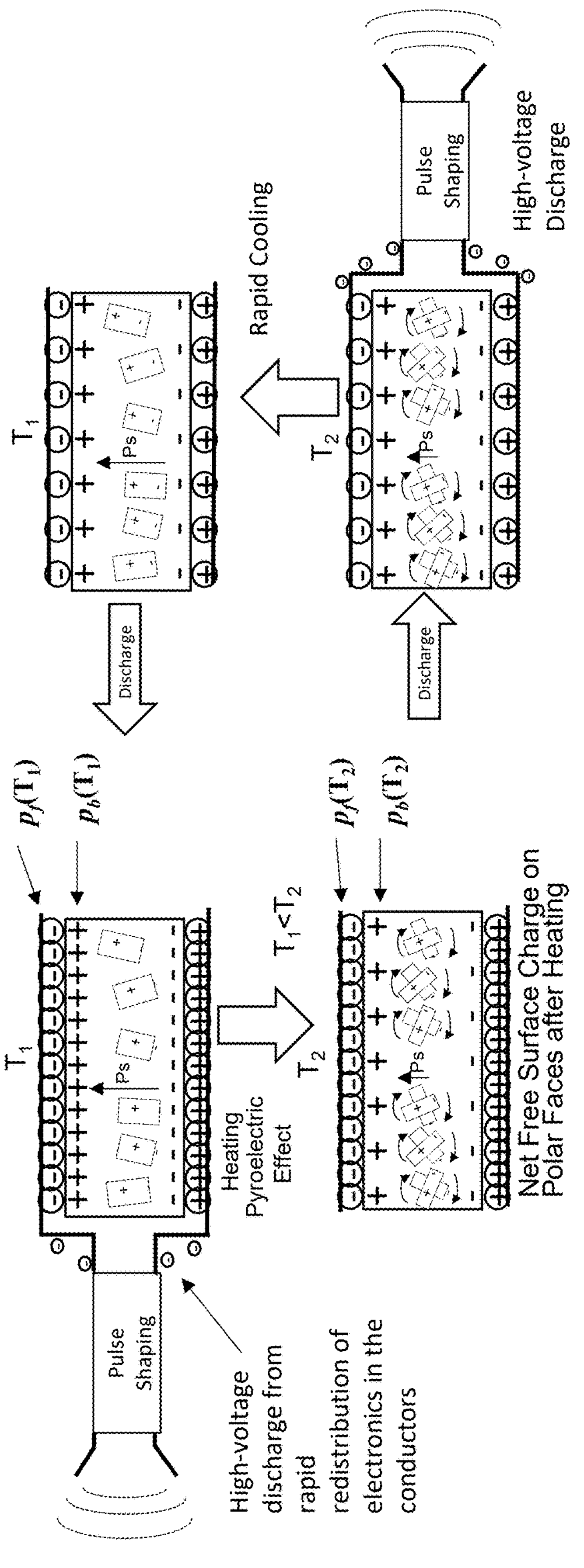
FIG. 6 is a schematic describing the operational phases of a pyroelectric EMP generator including heating, charge accumulation, and discharge, in accordance with embodiments of the present disclosure.

FIG. 6 presents schematically a dual-phase process involving rapid heating and rapid cooling of a pyroelectric element within the EMP generator system of other embodiments, providing two separate high voltage discharges 212 in a single thermal cycle. FIG. 6 illustrates the pyroelectric element 110 at an initial temperature $T_1$, the subsequent heating to a higher temperature $T_2$, and then rapid cooling back to a temperature $T_3$, where $T_3<T_2$.

As was described above, initially, at temperature $T_1$, the pyroelectric element 110 exhibits spontaneous polarization $\rho_f(T_1)$, with a corresponding bounded surface charge density $\rho_b(T_1)$. The free surface charge density $Ps(T_1)$ is neutralized by environmental charges. Upon heating to temperature $T_2$, the spontaneous polarization changes to $\rho_f(T_2)$, resulting in a new bounded surface charge density $\rho_b(T_2)$ and a net free surface charge of $Ps(T_2)$ on the polar faces 112 after heating, due to the pyroelectric effect. This accumulated charge is then discharged, creating a high voltage electrical discharge 212 that can be shaped by a pulse shaping subsystem 180.

Following the discharge at temperature $T_2$, the material is subjected to rapid cooling, bringing the temperature back down to $T_3$. In embodiments, this rapid cooling may be brought about by a forced cooling system, not illustrated. This rapid cooling leads to a reversal of the pyroelectric effect, causing a change in the polarization and a subsequent accumulation of charge with an opposite polarity to the initial charge. The rapidity of the cooling process prevents the environmental charges from neutralizing this newly accumulated charge, enabling production of a second high voltage discharge. This discharge, like the first, can be shaped into a pulse suitable for EMP generation.

The ability to rapidly cool the pyroelectric element and induce a second discharge is a significant feature of EMP generator systems of some embodiments, as the system allows for multiple uses of the pyroelectric element 110 even within a single thermal cycle. This rapid cooling phase contributes to enhanced system efficiency and operational readiness, enabling the generation of EMPs 214 in quick succession.

Note that while, in the above, examples of thermal cycles were presented where there was a single heating phase and a single cooling phase, other modes of thermal cycling are also possible, such as heating from $T_1$ to $T_2$ to produce a discharge, and then further heating from $T_2$ to a higher temperature, $T_4$, to produce another discharge, before finally cooling back to $T_3$. There is no limitation to only two heating phases, where, depending on the required performance, there may be any number of heating phases, each involving its associated discharge, limited only by material constraints (such as the Curie temperature of the material), and power constraints. In various embodiments these may be combined with multiple cooling phases as well, insofar as each phase has an adequate temperature change to induce adequate net surface charge to produce an EMP 214.

Figure 7:
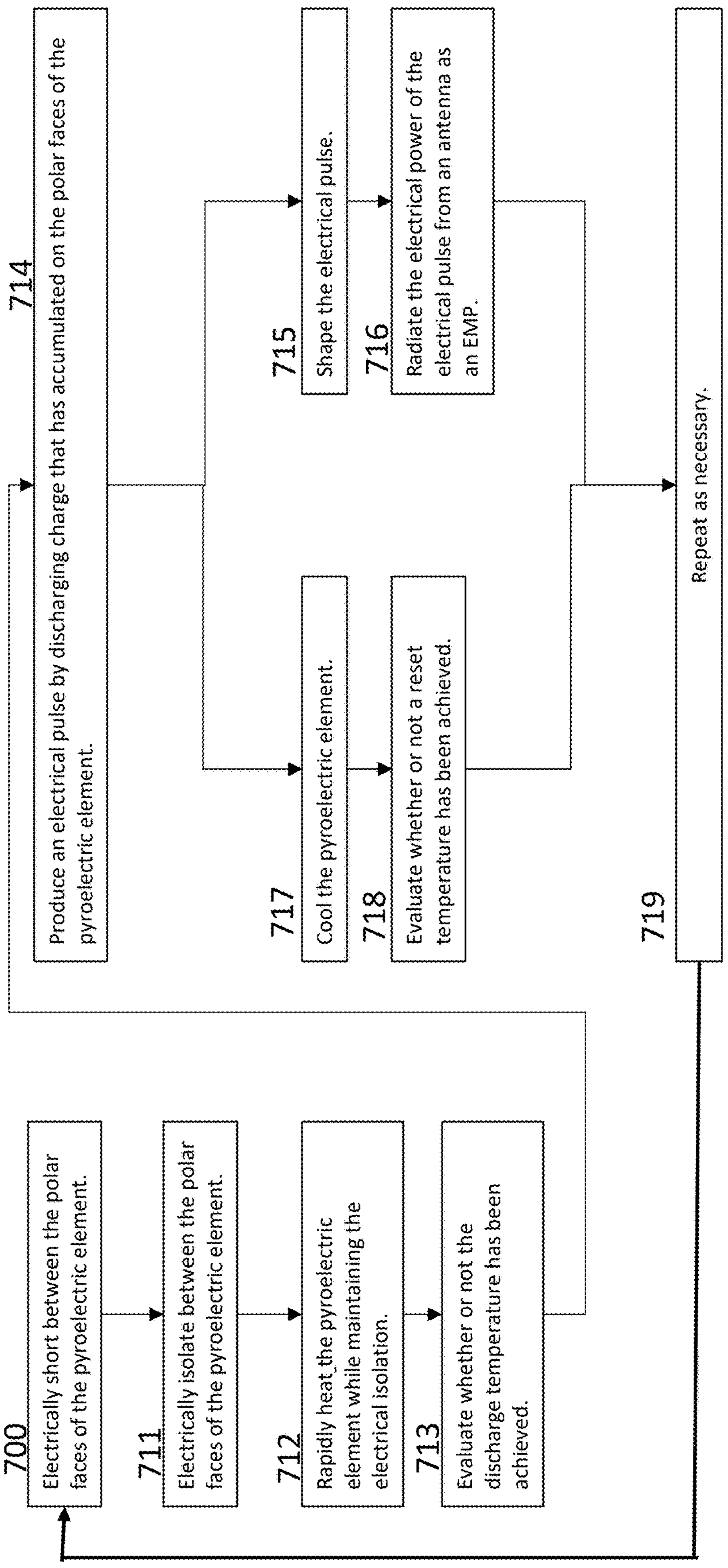
FIG. 7 is a flow chart outlining process steps for generating an EMP using a pyroelectric element, in accordance with embodiments of the present disclosure.

FIG. 7 outlines an embodiment of a method of generating an electromagnetic pulse (EMP) using a pyroelectric element 110 within the EMP generator system 100 as illustrated in FIG. 2. The method details the sequence of operational steps in an embodiment to produce and radiate an EMP 214. This embodiment uses the rapid-heating/slow-cooling technique described in reference to FIG. 5.

At a temperature $T_1$, which, in embodiments, may be approximately room temperature, the polar faces 112 of the pyroelectric element 110 are electrically shorted 710 to each other. In embodiments, this is achieved, in response to an operation by an operator on the arming switch 231, by the integrated control electronics 220 applying a signal to the discharge disable (shorting) control line 222 to close a switch (not numbered) to short across the pyroelectric element 110. Doing so ensures that any existing charge on the polar faces is neutralized, setting a baseline for the subsequent charge accumulation. This step is not necessary in embodiments where residual charge on the polar faces 112 would not interfere substantially with performance of the system.

The polar faces of the pyroelectric element 110 are then electrically isolated 711 from each other. This is achieved by the integrated control electronics 220 applying a signal to the discharge disable (shorting) control line 222 to open a switch (not numbered) to stop shorting across the pyroelectric element 110, and also applying a signal to the trigger control line to open the switch (not numbered) that is controlled thereby. This isolation serves to prevent charge leakage and ensure that the charge generated by the pyroelectric effect is retained to enable use thereof in producing an EMP 214. Note that, as a physical reality, no isolation in a real-world device can be perfect, so some degree of charge leakage between the polar faces 112 is inevitable. The state of isolation referred to in this disclosure is a state where all wired connections that would discharge the polar faces 112 of the pyroelectric element 110 are open so that the only discharge is through the inevitable discharge through the environment.

The pyroelectric element 110 is then rapidly heated 712 while maintaining the electrically isolated state. This is achieved by the integrated control electronics 220 applying a signal to the heating switch 135, to cause power to flow to the heating element 130. The rapid heating serves to induce the pyroelectric effect, which leads to the development of charge imbalance between the polar faces 112 of the pyroelectric element 110, resulting in the high voltage across the pyroelectric element 110. Note that here "rapidly" refers to a speed with adequate rapidity to enable substantial retention of the free charges on the polar faces 112, without discharging substantially through natural auto-discharging through the pyroelectric element or through natural conduction through the environment surrounding the pyroelectric element, where "discharging substantially" is intended to mean dissipation of charge to a degree that would interfere with or prevent generation of the desired EMP. Quantitatively, the heating time must be much shorter than the RC time constant that can be calculated from an empirically-observed resistance to leakage though the environment and the capacitance of the pyrolytic element 100. In an exemplary embodiment this heating is achieved over a period of approximately eight seconds.

Whether or not a discharge temperature of $T_2$ has been achieved is then evaluated 713. This is achieved by the integrated control electronics 220 evaluating an input from the dielectric temperature sensor 140. This evaluation ensures that the pyroelectric element has reached a temperature that produces adequate charge for generating an EMP 214, prior to continuing on with the next process element. In an exemplary embodiment this discharge temperature $T_2$ may be approximately 150K greater than $T_1$, which, in laboratory testing of an exemplary embodiment constructed for testing purposes, developed 215 kV of voltage on a 10 mm×5 mm×5 mm pyroelectric element 110 made from $LiTaO_3$ crystal, where the polar faces 112 were separated by 10 mm.

Once the discharge temperature of $T_2$ has been confirmed, an electrical discharge 212 is produced 714 by discharging the charge that has accumulated on the polar faces 112 of the pyroelectric element 110. This is achieved by the integrated control electronics 220 applying a signal to the trigger control line 224 to close a switch (not numbered) to cause the electrical discharge 212. In embodiments the integrated control electronics 220 may perform this process element automatically after the discharge temperature $T_2$ has been reached, or, in other embodiments, may illuminate the ready indicator 233 and wait until an operator uses a remote control 230 or 235 to activate the trigger switch 232. The electrical discharge 212 produced will serve as the primary source of the EMP 214.

The electrical discharge 212 is shaped 715 to achieve the desired characteristics of the EMP 214. As can be appreciated by those skilled in the art, in embodiments pulse shaping may be achieved through the use of inductive, capacitive, and/or resistive elements to adjust the pulse width, amplitude, and other parameters of the electrical discharge 212 to align with the desired characteristics of the EMP 214 depending on the requirements of the use application.

After shaping the electrical discharge 212, the electrical power of the electrical discharge 212 is radiated 716 from the broadband radiating element 210 as an EMP 214. This is achieved through application of the shaped electrical discharge 212 to the broadband radiating element 210.

The pyroelectric element 110 is cooled 717, preparing the pyroelectric element 110 for another cycle of EMP generation. The cooling may or may not be performed simultaneously with the shaping 715 and radiating 716 that is described above. In embodiments wherein there is no need for generation of another pulse immediately, the cooling 717 may be achieved through natural cooling. In embodiments, the natural cooling may be facilitated through reducing the thermally insulative properties of the thermal chamber 150, through opening of vents (not illustrated), physical contacting a heat sink to a thermal conductor (not illustrated) that penetrates the thermal chamber 150, or some other method of providing a route for heat to escape from within the thermal chamber. Such methods would be apparent to those skilled in the art and are not central to the present disclosure, so will not be described here.

Whether or not a reset temperature has been achieved is evaluated 718. This is achieved by the integrated control electronics 220 evaluating an input from the dielectric temperature sensor 140. This confirms that the pyroelectric element has returned to a reset temperature suitable for starting the next EMP generation cycle. In embodiments this reset temperature may be the initial temperature $T_1$, or may be another prescribed temperature $T_3$ that is adequately lower than $T_2$ to enable use as the starting temperature (defined as $T_1$ for the subsequent cycle) for another thermal cycle.

If required by the use application, the process set forth above is repeated 719, allowing for continuous or repeated EMP generation through multiple cycles of heating and cooling as the use application requires. In embodiments the cycle is terminated when the battery pack 170 becomes depleted, or when an operator operates the arming switch 231 again to remove power from the system, or after a prescribed time has passed with the EPM generator in state waiting discharge without the operator operating the remote control 230 or 235 to trigger the discharge to fire the EMP.

Figure 8:
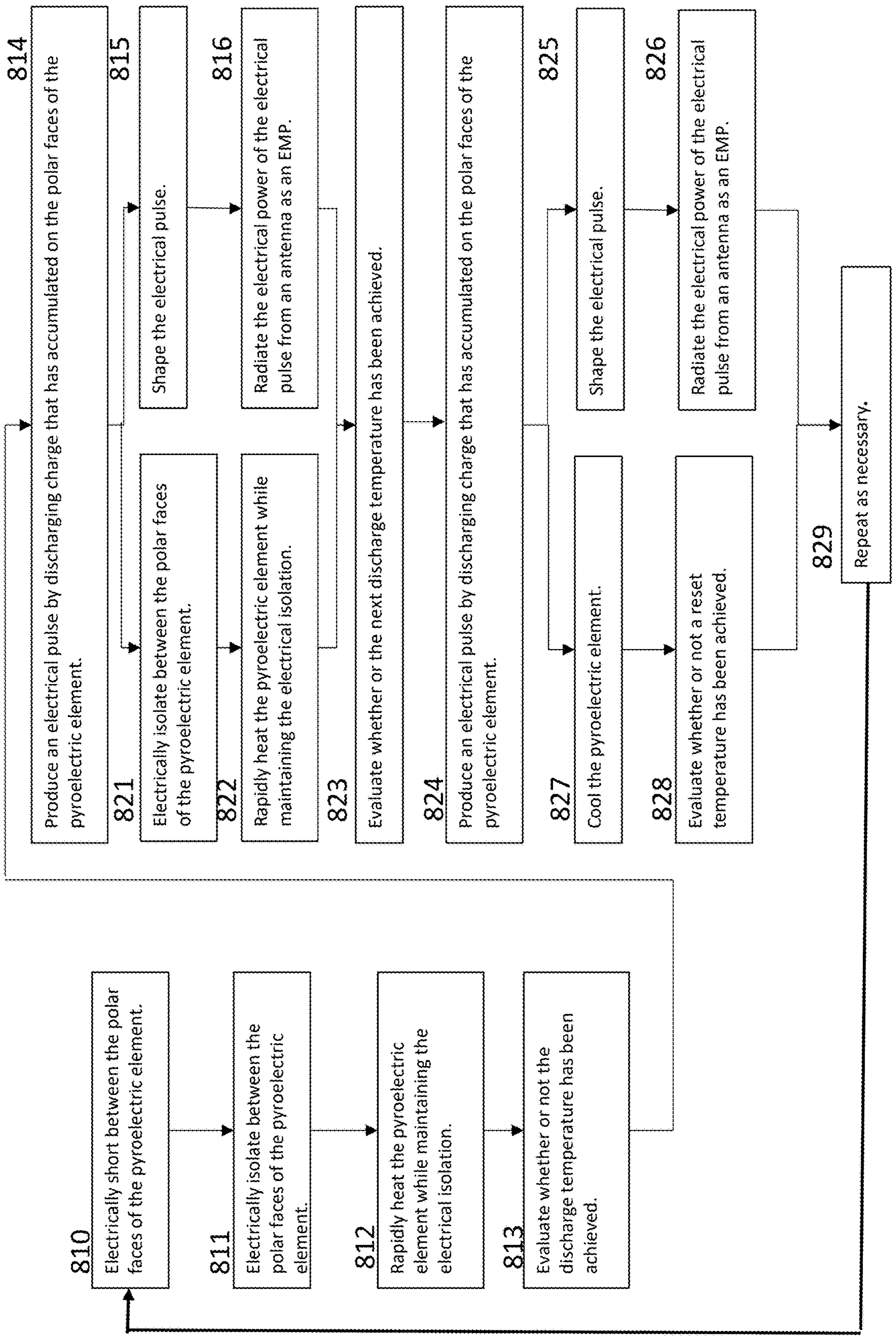
FIG. 8 is a flow chart outlining the process steps for generating an EMP using a pyroelectric element, in accordance with embodiments of the present disclosure.

FIG. 8 provides a method that describes an iterative process for generating multiple electromagnetic pulses (EMPs) using a pyroelectric element 110 in an EMP generator system 100 as illustrated in FIG. 2. As with the embodiment described using FIG. 7, this method includes electrical shorting 810 and isolating 811, heating 812, evaluating 813, discharging 814, shaping 815, and radiating 816 of the EMP 214. As these process elements are identical to those explained using FIG. 7 for the electrical shorting 710 and isolating 711, heating 712, evaluating 713, discharging 714, shaping 715, and radiating 716 of the EMP 214, redundant explanations will be omitted.

The electrical shorting 810 through radiating 816 are performed identically to that which has been explained above.

Simultaneously with, or subsequent to, the shaping 815 and the radiating 816, the polar faces 112 of the pyroelectric element 110 are electrically isolated 821 from each other again, in the same manner as with 811, above, to prepare for a subsequent heating phase.

The pyroelectric element 110 is heated 822 rapidly while maintaining the electrical isolation, leading to further charge accumulation, in the same manner as with 812, above.

Whether or not the next discharge temperature has been achieved is evaluated 823, to ensure that the pyroelectric element is ready for another discharge. This is achieved in the same manner as with 813, above, except that in this process element a discharge temperature of $T_4$ is used, where $T_4 > T_2$. In an exemplary embodiment this discharge temperature $T_4$ may be approximately 150K greater than $T_2$, but this temperature differential may be adjusted depending on the properties of the pyroelectric material used in the pyroelectric element 110.

In the same manner as with 814, above, a second electrical discharge 212 is produced 824 by discharging the newly accumulated charge, and shaped 825 and radiated 826 in the same manner as with 815 and 816, respectively, above.

In the same manner as with 717, above, the pyroelectric element is cooled 827, resetting the system for another cycle of EMP generation, followed by evaluating 828, in the same manner as with 718, above, whether or not a reset temperature has been achieved, confirming the system is ready for the next cycle. Note that, as described above, these process elements may be performed either simultaneously with, or subsequent to, the shaping 825 and radiating 826.

If required by the use application, the process is repeated 829 from 810, above, allowing for continuous or repeated EMP generation based on operational conditions, or terminated, as described for 719 above.

Figure 9:
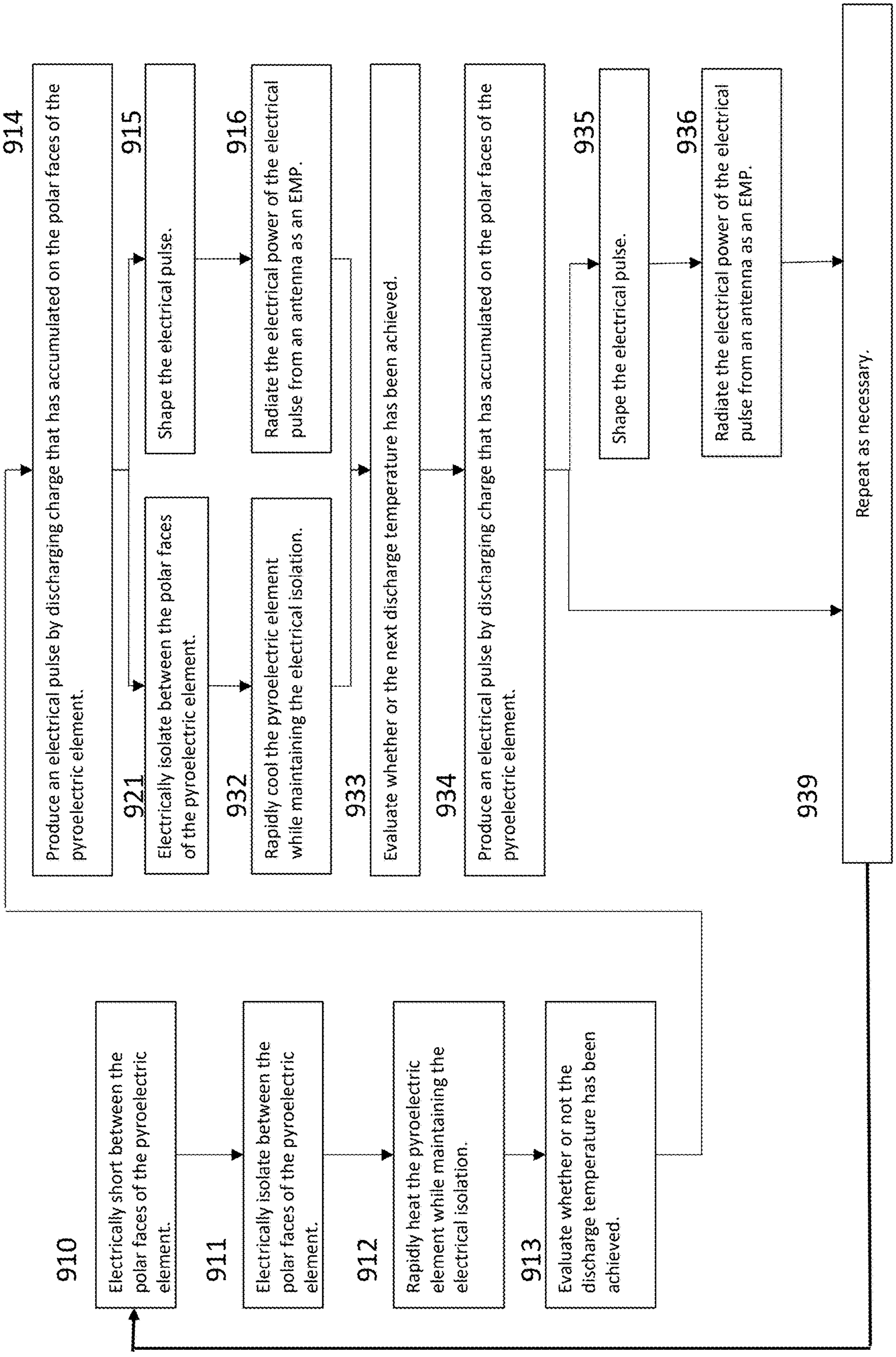
FIG. 9 is a flow chart outlining the process steps for generating an EMP using a pyroelectric element, in accordance with embodiments of the present disclosure.

FIG. 9 presents yet another embodiment of generating an EMP through a cyclical process using a pyroelectric element. The method in the embodiment illustrated by the flow chart in FIG. 9 differs from the embodiments in FIG. 7 and FIG. 8 in that a rapid cooling 932 process element is introduced. While the introduction of the rapid cooling 932 has advantages in that the EMP generator system 100 will be able to generate a series of EMPs much more quickly than with the systems explained using FIG. 7 and FIG. 8, the system will be substantially more complex and consume much more power, and thus is more suitable for use applications that are less sensitive to size, weight, and power constraints. While the embodiment illustrated in FIG. 2 envisions the methods in FIG. 7 and FIG. 8, and in an exemplary embodiment that was constructed for test purposes was successfully kept to the size of a football and operated on the battery pack 170, the addition of a cooling system for the rapid cooling 932 will require a larger size, and preclude operation purely on typical batteries.

As with the embodiments described using FIG. 7 and FIG. 8, this method also includes electrical shorting 910 and isolating 911, heating 912, evaluating 913, discharging 914, shaping 915, and radiating 916 of the EMP 214. These process elements are identical to those described above, and redundant explanations will be omitted.

The electrical shorting 910 through radiating 916 are performed identically to the electrical shorting 710 through radiating 716 that have been explained above using FIG. 7, and the isolating 921 is performed identically to the isolating 821 that was explained using FIG. 8.

Following this isolating 921, the pyroelectric element 110 is rapidly cooled 932 while maintaining the electrical isolation. This rapid cooling 932 may be achieved, under the control of the integrated control electronics 220, through the use of a known forced cooling system (not illustrated), such as chilled refrigerant cooling, insofar as the cooling can be achieved rapidly enough that the net free charge that will develop on the polar faces 112 of the pyroelectric element 110 will not dissipate prior to adequate cooling required to produce an EMP 214. Unlike the relatively slow cooling 912, above, the rapid cooling 932 serves not only to reset the pyroelectric element 110 for a subsequent heating phase, but also to develop a high voltage across the polar faces 112 of the pyroelectric element 110, enabling the production of an EMP following the cooling phase as well.

Whether or not a cooled discharge temperature has been achieved is evaluated 933. This is achieved in the same manner as with evaluations 913 and 823, above, except that in this process element 933 the discharge temperature $T_3$ is used, where $T_3 < T_2$. In an exemplary embodiment this discharge temperature $T_3$ may be approximately 150K less than $T_2$, but this temperature differential may be adjusted as appropriate depending on the properties of the pyroelectric material used in the pyroelectric element 110, and should be near the initial starting temperature $T_1$.

In the same manner as with 914, above, a second electrical discharge 212 is produced 934 by discharging the newly accumulated charge, and shape 935 and radiate 936 in the same manner as with 915 and 916, respectively, above.

Processing is repeated 939 from process element 911, above, allowing for the continuous or repeated generation of EMPs 214 as the use application requirements dictate, or terminated, as described for 719 above.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. For example, the number of heating phases in the embodiment explained using FIG. 8 is not limited to two, but rather may be increased within the constraints of the materials and available power. While in FIG. 7 and FIG. 8 the cooling phases involved cooling to near to the initial temperature $T_1$, there is no limitation thereto, but rather the next heating phase may be started at a temperature that is substantially higher than $T_1$. While FIG. 9 illustrated a single heating phase and single cooling phase, each with its respective EMP generation, there may be multiple heating and cooling phases with generation of their respective EMPs. Although operations are depicted in the drawings in a particular order, this should not be understood as requiring that such operations be performed in the particular order shown or in sequential order, or that all illustrated operations must be performed, to achieve desirable results. For example, the iterative processing in FIG. 8 may start with process element 21 followed by the rapid cooling of 832, without having a heating phase prior to the first cooling phase.

EXPLANATIONS OF REFERENCE NUMERALS

31: Oxygen Lattice Anion
32: Tantalum Cation
33: Lithium Cation
100: Electromagnetic Pulse (EMP) Generator System
110: Pyroelectric Element ($LiTaO_3$ Crystal)
112: Polar Face
114: Lead Wire
120: Dielectric Bath
130: Heating Element
135: Heating Switch
140: Dielectric Temperature Sensor
145: Heater Coil Temperature Sensor
150: Thermal Chamber
160: Switched Pulse Actuator
170: Battery Pack
180: Pulse Shaping Subsystem
190: Power Supply Unit
195: External Power Input
210: Broadband Radiating Element (Ultrawideband Antenna, Ultrawideband Tapered Slot Antenna)
212: Electrical Discharge
214: Electromagnetic Pulse Radiation (EMP)
220: Integrated Control Electronics
222: Discharge Disable (Shorting) Control Line
224: Trigger Control Line
230: Remote Control (Wired)
231: Arming Switch
232: Trigger Switch
233: Ready Indicator
235: Remote Control (Wireless)
236: Remote Arming Signal
237: Remote Trigger Signal
240: Isolator
242: Optical Isolator
244: Optical Link
246: Radio Transceiver
248: Radio Link
250: Electrode
d: Distance Between Polar Faces of Pyroelectric Element
A: Area of Polar Face of Pyroelectric Element

What is claimed is:

1. An electromagnetic pulse (EMP) generator system, the system comprising:
- a dielectric bath;
- a pyroelectric element having a body and opposing faces that is immersed in the dielectric bath and configured to accumulate high-voltage charge across the polar faces;
- a heating element configured to heat the dielectric bath and the pyroelectric element;
- a temperature sensor configured to sense the temperature of the dielectric bath or the pyroelectric element;
- a thermal chamber for enclosing the pyroelectric element, the dielectric bath, the heating element, and the temperature sensor, and for providing thermal insulation from external environments; and
- a switched pulse actuator configured to control and actuate a rapid electrical discharge of the accumulated charge from the pyroelectric element.

2. The EMP generator system of claim 1, further comprising a battery pack for powering at least the heating element to heat the dielectric bath and the pyroelectric element.

3. The EMP generator system of claim 1, further comprising a pulse shaping subsystem configured to shape the electrical discharge in the time domain.

4. The EMP generator system of claim 1, wherein the dielectric bath comprises a solid dielectric, a liquid dielectric, and/or a gel dielectric.

5. The EMP generator system of claim 1, further comprising a broadband radiating element for radiating, as electromagnetic pulse radiation, energy from the electrical discharge.

6. The EMP generator system of claim 5, wherein the broadband radiating element is an ultrawideband directional antenna and/or an ultrawideband antenna configured so as to radiate the electromagnetic pulse radiation substantially isotropically.

7. The EMP generator system of claim 1, further comprising integrated control electronics to control and coordinate the EMP generator system.

8. The EMP generator system of claim 7, further comprising a remote control configured to communicate with the integrated control electronics.

9. The EMP generator system of claim 8, further comprising an isolator configured to provide electrical isolation between the remote control and the integrated control electronics while facilitating data communication between the remote control and the integrated control electronics.

10. The EMP generator system of claim 9, wherein the isolator comprises an optical link and/or a radio link.

11. The EMP generator system of claim 2, wherein the battery pack is rechargeable.

12. The EMP generator system of claim 1, wherein the pyroelectric element comprises an $LiTaO_3$ crystal.

13. The EMP generator system of claim 1, wherein the pyroelectric element comprises a plurality of pyroelectric sub-elements that are connected in series and/or connected in parallel.

14. The EMP generator system of claim 1, wherein each of the opposing polar faces of the pyroelectric element or of a pyroelectric sub-element is in intimate electrical contact with an electrical conductor that covers less than the entirety of the polar face.

15. A method for generating an electromagnetic pulse (EMP), the method comprising:
- electrically isolating between two polar faces of a pyroelectric element at a temperature $T_1$;
- heating the pyroelectric element to a temperature $T_2$ ($T_2>T_1$) while maintaining the electrical isolation;

discharging a charge that has accumulated on the polar faces of the pyroelectric element to thereby produce an electrical pulse;

radiating the electrical pulse from an antenna; and cooling the pyroelectric element to a temperature $T_3$ ($T_3<T_2$), wherein:

while maintaining a state of electrical isolation between the polar faces of the pyroelectric element, heating of the pyroelectric element is carried out such that the heating is achieved over a time interval that is shorter than the RC time constant of an equivalent resistance-capacitance circuit.

16. The method for generating an EMP as set forth in claim 15, further comprising electrically shorting the two polar faces of the pyroelectric element.

17. The method for generating an EMP as set forth in claim 15, further comprising further heating the pyroelectric element to a temperature $T_4$ ($T_4>T_2$) while maintaining electrical isolation.

18. The method for generating an EMP as set forth in claim 15, wherein, while maintaining a state of electrical isolation between the polar faces of the pyroelectric element, cooling of the pyroelectric element is carried out such that the cooling is achieved over a time interval that is shorter than the RC time constant of an equivalent resistance-capacitance circuit.

19. The method for generating an EMP as set forth in claim 15, wherein cooling of the pyroelectric element is carried out through natural cooling.

20. The method for generating an EMP as set forth in claim 15, further comprising shaping the electrical pulse.

* * * * *